(12) United States Patent
Choi

(10) Patent No.: US 11,303,720 B2
(45) Date of Patent: Apr. 12, 2022

(54) ORIGIN AND CACHE SERVER COOPERATION FOR COMPUTE-INTENSIVE CONTENT DELIVERY

(71) Applicant: Akamai Technologies, Inc., Cambridge, MA (US)

(72) Inventor: Byung K. Choi, Cambridge, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 16/888,202

(22) Filed: May 29, 2020

(65) Prior Publication Data

US 2020/0404070 A1 Dec. 24, 2020

Related U.S. Application Data

(63) Continuation of application No. 15/704,978, filed on Sep. 14, 2017, now Pat. No. 10,764,391.

(51) Int. Cl.
| | |
|---|---|
| *H04L 67/2885* | (2022.01) |
| *H04L 67/568* | (2022.01) |
| *H04L 67/5651* | (2022.01) |
| *H04L 67/564* | (2022.01) |
| *H04L 67/1097* | (2022.01) |
| *H04L 67/52* | (2022.01) |

(52) U.S. Cl.
CPC ...... *H04L 67/2885* (2013.01); *H04L 67/1097* (2013.01); *H04L 67/2819* (2013.01); *H04L 67/2828* (2013.01); *H04L 67/2842* (2013.01); *H04L 67/18* (2013.01)

(58) Field of Classification Search
CPC .. H04L 67/2885; H04L 67/1097; H04L 67/18
USPC .......................................................... 709/219
See application file for complete search history.

(56) References Cited

U.S. PATENT DOCUMENTS

| | | | |
|---|---|---|---|
| 6,006,264 A | 12/1999 | Colby et al. | |
| 6,108,703 A | 8/2000 | Leighton | |
| 6,185,598 B1 | 2/2001 | Farber et al. | |
| 6,421,726 B1 | 7/2002 | Kenner et al. | |
| 6,513,061 B1 | 1/2003 | Ebata et al. | |
| 10,432,723 B2 * | 10/2019 | Sawada .............. | G06F 15/167 |
| 10,764,391 B2 | 9/2020 | Choi et al. | |

(Continued)

OTHER PUBLICATIONS

U.S. Appl. No. 15/704,978, filed Sep. 14, 2017.
Information Disclosure Statement With Communication Under MPEP § 609.02, letter of May 29, 2020, 2 pages.

*Primary Examiner* — Wing F Chan
*Assistant Examiner* — Leon Y Tseng

(57) ABSTRACT

This document describes systems, methods and apparatus for locating an object and/or processed versions of that object in a CDN cache system. When a CDN server needs to send a forward request to an origin server to retrieve an object, the CDN server can append a 'cache hint' (sometimes referred to herein as a pointer or as 'reverse cookie') to its request. The cache hint preferably includes information that will be stored at the origin server and provided to other CDN servers that subsequently ask for the same object. Preferably the information is a pointer that will enable the object to be located within the CDN and/or enable the location of modified version of the object that have already been created and stored within the CDN.

13 Claims, 10 Drawing Sheets

(56) References Cited

U.S. PATENT DOCUMENTS

2012/0166591 A1* 6/2012 Eggleston ........... H04L 61/1511
  709/218
2015/0100667 A1* 4/2015 Freyria .......... H04N 21/234309
  709/219
2019/0082027 A1 3/2019 Choi

* cited by examiner

ORIGIN AND CACHE SERVER COOPERATION FOR COMPUTE-INTENSIVE CONTENT DELIVERY

BACKGROUND

Technical Field

This application relates generally to content delivery networks and to the delivery of objects to users over computer networks.

Brief Description of the Related Art

Content delivery networks (CDNs) are known in the art. Typically CDNs employ a set of proxy servers distributed across the Internet. A given server in the CDN receives a request for an object (e.g., an HTML document, an image file, scripts, cascading style sheets, videos, XML documents) from an end user client device. The server checks whether it has a valid copy (i.e., unexpired) of the object in its local cache. If so, it can serve the request from the cache. If not, it issues a forward request to obtain the content from an origin server.

In some implementations the CDN may arrange servers in a cache hierarchy. Cache hierarchies are known the art. In a typical cache hierarchy, each client-facing server has a cache parent (or cache parent group), which may be statically or dynamically assigned. The child server goes to the cache parent to see if it has the object before going to the origin. If the parent does not have the object in cache either, then either the parent or the child server goes to origin. Some cache hierarchies have additional layers. For more information on cache hierarchies in CDNs, see U.S. Pat. No. 7,376,716 and see aso Chankhunthod et al., "A Hierarchical Internet Object Cache", Proceedings of the USENIX 1996 Annual Technical Conference, San Diego, Calif. 1996, the disclosure of both of which is incorporated herein by reference for all purposes. For information on how cache parents can be dynamically chosen (and cache hierarchies formed based on network conditions and distances), see U.S. Pat. No. 7,274,658 the disclosure of which is incorporated by reference herein for all purposes.

It is costly, from both a performance and load perspective, to go back to the origin for an object. This cost is particularly high when the CDN modifies an object after retrieval. For example, a CDN may offer a service that optimizes an object for a client device based on things such as client device type, capabilities, bandwidth, geographic location, or other characteristic. Images represent significant portion of the data on a website, so optimizing an image for a particular requesting client device can yield significant benefits.

As another example, a CDN may offer an image management service that creates a set of images derived from a master image in a manner controlled and/or configured for the website owner. Given one high-resolution image, a CDN image management service may create several versions of that image (e.g., high resolution, low-resolution, various sizes, watermarked, recompression, and so on). The resulting set of derived images can be stored in the cloud by the CDN. Future requests by client devices can be served from this set. Preferably, the set of images also can be accessed by the content provider enterprise for creative development purposes.

As a final example, a CDN may offer a multimedia transcoding service for multimedia presentations. This is analogous to the image processing case, but even more compute-intensive.

It is wasteful for a CDN to repeatedly execute the kinds of processing described above if the original objects and/or their processed versions are already available somewhere in the CDN platform. However, it is difficult to create an efficient system that enables a given server in the CDN to know if such content is already available, and if so, where to find it. While one could utilize a variety of indexing and lookup mechanisms within the CDN, such systems are likely to impose more overhead that they save in a large-scale CDN with massive amounts of objects that are dynamically changing over time as content providers update their websites.

The teachings hereof address this technical problem. The teachings hereof can be used to mitigate the cost of a CDN repeatedly asking the origin for an object, particularly in the case of an object that is modified after retrieval from the origin. The teachings hereof also provide other benefits and improvements that will become apparent in view of this disclosure.

A general background on CDNs is now provided.

A "content delivery network" or "CDN" is often operated and managed by a service provider. The service provider typically provides the content delivery service on behalf of third parties. A distributed system of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, e.g., the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN's components may be located at nodes that are publicly-routable on the Internet, within or adjacent nodes that are located in mobile networks, in or adjacent enterprise-based private networks, or in any combination thereof.

In a known system such as that shown in FIG. 1, a distributed computer system 100 is configured as a content delivery network (CDN) and has a set of computer machines 102 distributed around the Internet. Typically, most of the machines are configured as servers and located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the servers (which are sometimes referred to as content servers, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client devices 122 that desire such content may be directed to the distributed computer system to obtain that content more reliably and efficiently. The CDN servers 102 respond to the client device requests, for example by obtaining requested content from a local cache, from another CDN server 102, from the origin server 106, or other source.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN, and which acts as a request routing mechanism to direct clients to a selected CDN server 102. A distributed data transport mechanism 120 may be used to distribute control information (sometimes referred to as "metadata") to the CDN servers.

A more detailed illustration of an embodiment of a CDN server 102 is provided in FIG. 2. As illustrated in FIG. 2, a given machine 200 in the CDN comprises commodity hardware (e.g., a microprocessor) 202 running an operating system kernel (such as Linux® or variant) 204 that supports one or more applications 206*a-n*. To facilitate content delivery services, for example, given machines typically run a set of applications, such as an HTTP (web) proxy server 207, a name service 208, a local monitoring process 210, a distributed data collection process 212, and the like. The HTTP proxy server 207 (sometimes referred to herein as a HTTP proxy for short) is a kind of web server and it typically includes a manager process for managing a local cache and delivery of content from the machine. For streaming media, the machine may include one or more media servers, as required by the supported media formats.

A CDN server 102 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (again sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

Preferably, the CDN operates a DNS infrastructure to route client requests (i.e., request routing service) to a selected CDN server 102. In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname the CDN, and that hostname is then resolved through the CDN name service. To that end, the CDN domain name service returns one or more IP addresses (via consultation with the mapmaker shown in FIG. 1). The requesting client application (e.g., a web browser) then makes a content request (e.g., via HTTP or HTTPS) to a CDN server 102 associated with the IP address. The request includes a host header that includes the original content provider domain or sub-domain. Upon receipt of the request with the host header, the CDN server 102 checks its configuration file to determine whether the content domain or sub-domain requested is actually being handled by the CDN. If so, the CDN server 102 applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server 102 should use when processing that request.

A CDN may have a variety of other features and adjunct components. For example the CDN may include a network storage subsystem (sometimes referred to as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, as well as a transcoding system as described in U.S. Pat. No. 9,432,704, the disclosures of which are incorporated herein by reference.

SUMMARY

This document describes systems, methods and apparatus for locating an object and/or processed versions of that object in a CDN cache system. When a CDN server needs to send a forward request to an origin server to retrieve an object, the CDN server can append a 'cache hint' (sometimes referred to herein as a pointer or as 'reverse cookie') to its request. The cache hint preferably includes information that will be stored at the origin server and provided to other CDN servers that subsequently ask for the same object. Preferably the information is a pointer that will enable the object to be located within the CDN and/or enable the location of modified version of the object that have already been created and stored within the CDN.

The cache hint can comprise an IP address, for example. The IP address can point to the CDN server that is making the request for the object, or the cache hierarchy with which that CDN server is associated, or a CDN object-processing asset (such as a image processing server or transcoder) that will process the retrieved object for that CDN server, a network storage component that will be used to store the object once fetched from the origin, or some other CDN asset. The IP address may be a virtual IP address.

Alternatively the cache hint could be a hostname that a DNS infrastructure associated with the CDN will resolve to locate the appropriate cache, cache hierarchy, object processing component or other CDN asset. Note that the cache hint can contain multiple pieces of information of varying specificity, e.g., an IP address, a cluster identifier, a cache hierarchy identifier, and so on.

It is noted that in some implementations, the information in the cache hint could be encrypted so that information about the CDN and in particular the location of CDN assets is not exposed by the cache hint. In this approach, the origin server essentially stores and opaque 'blob' of data on behalf of the CDN and hands it out in response to requests. Encryption can be done using any standard encryption method, such as a secure hash, e.g. SHA-256, or the like.

As mentioned above, if and when the origin is contacted by another CDN server (referred to in this example as the 'second' CDN server for clarity) for the same object, the origin provides the cache hint instead of the actual object. This provides a processing and bandwidth savings for the origin. Moreover the second CDN server saves time and processing because upon receiving the cache hint can contact the CDN asset that the pointer in the cache hint identifies. This means that the second CDN server can read the pointer and, e.g., send a request to the IP address or resolve the hostname to find an IP address, as the case may be, or otherwise follow the pointer to the object.

Preferably the cache hint is accompanied by a time to live (TTL) value. Once the TTL value expires the cache hint is no longer valid to locate an object previously fetched from the origin. The CDN server receiving the cache hint can check the TTL so see if the hint is valid and if not, re-request the object from origin.

Preferably, however, the origin is able to read the TTL and determine whether the cache hint has expired before sending it instead of the actual object. In other words, at least the TTL for the cache hint may be stored in the clear, even if the cache hint itself is encrypted. In this way, if a second CDN server receives the cache hint from an origin, the copy of the object in the CDN located by the pointer is likely to be current and not evicted from a cache. If the cache hint is expired then the origin can obtain the actual object from its storage device and serve it to the second CDN server, similar to a conventional web server operation. In addition, the origin can then store the cache hint that was included with the second CDN server's request. This means that the expired cache hint is updated and replaced with the second CDN server's cache hint, as the second CDN server is receiving the current copy of the object. The origin then begins to provide cache hints pointing to the second CDN server (or to a cache hierarchy or processing component associated with it, etc.).

As those skilled in the art will recognize, the foregoing description merely refers to examples of the invention. There are many variations of the inventive teachings described above and otherwise herein. The claims alone define the scope of the invention.

While there are a variety of tools and features incorporated into modem-day HTTP and web servers, they do not address the technical problem solved by this invention, and they are distinct from the teachings hereof.

HTTP Cookies are known in the art, for example. HTTP servers are fundamentally designed to be stateless. A cookie can be used to help simplify end-to-end application logic between the client (e.g., a browser) and server. From a high level view, this can be considered a collaboration between client and server to make the entire system more efficient. However, cookies are created by the server and stored by a client. The teachings hereof contemplate collaboration between a cache server and an origin server, where a cache hint is generated by the cache server (acting as a client) and kept by the origin server for later use. The origin server preferably does not know the content of cache hint. Further, the existence of the cache hint alters the behavior of the origin server; conventional cookies are not used by clients in such a way, much less as described herein.

HTTP server hints are known in the art. For example, Google has proposed a project called Server Push and Server Hint as part of an umbrella project, the Chromium Projects. The "Server Push" functions to push some unrequested web objects to the client by the server in anticipation that the client would request the objects very soon. The "Server Hint" lets the client know the availability of some unrequested web objects by the client in anticipation that the client might want to download the web objects soon. As the purposes manifest, the conventional HTTP server hints are different from the teachings proposed in this paper.

HTTP client hints are known in the art. There is a proposal about HTTP client hint (See IETF—HTTP Client Hints, I Grigorik, ed.). This idea is to allow and encourage the user agent, e.g., a browser, to explicitly express the capability of the end user client device at the moment of HTTP request so that the server can accordingly adapt the content to the physical device specifics. The purposes of "client hint" are actually in line with end user device characterization already available with major CDNs, e.g., Akamai Technologies Inc.'s Edge Device Characterization. Such conventional end user device characterization and client hints are distinct from the teachings hereof.

HTTP cache-control headers are known in the art. They are used by a server to define the valid caching period or the authorized lifetime of the web object down the delivery path. But this is distinct from the teachings hereof.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Figure 1:
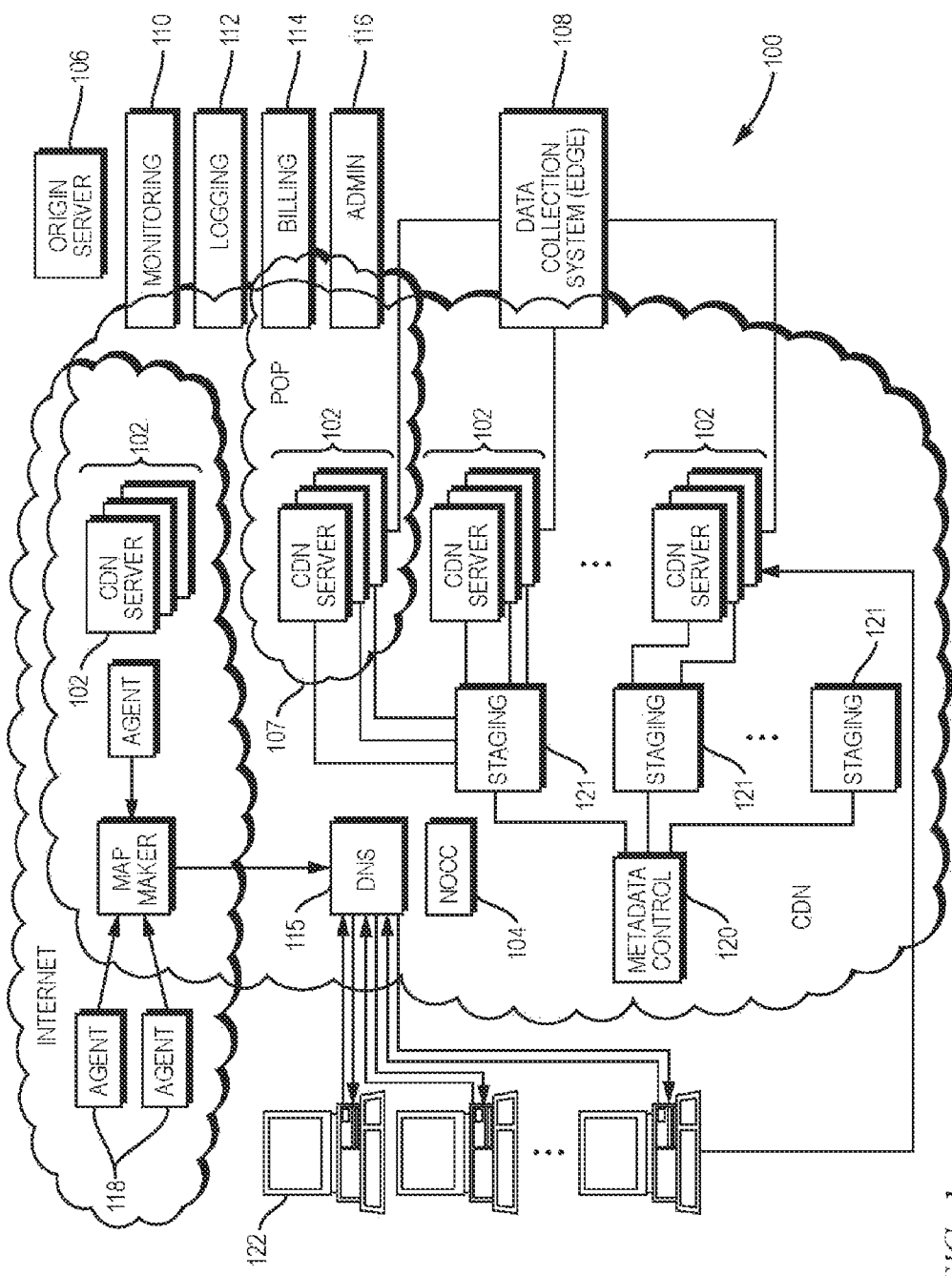
FIG. 1 is a schematic diagram illustrating one embodiment of a distributed computer system configured as a CDN.
Figure 2:
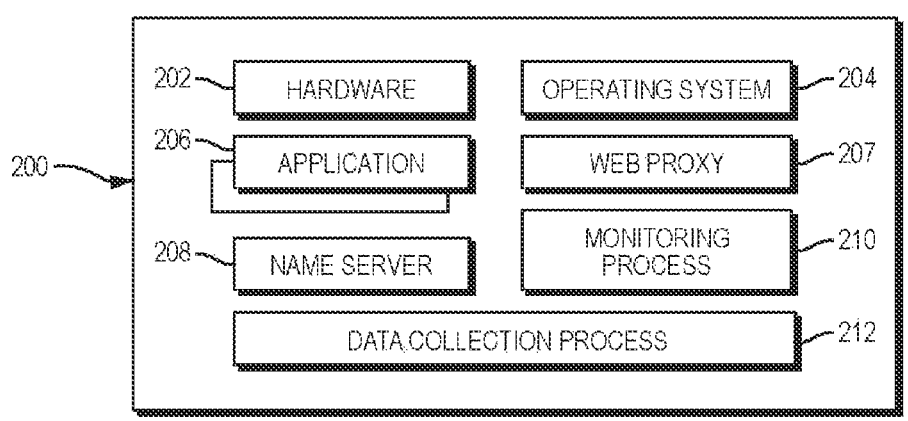
FIG. 2 is a schematic diagram illustrating one embodiment of a machine on which a CDN server in the system of FIG. 1 can be implemented.

The teachings hereof may be implemented in a server and in particular in a CDN server 102, 200 of the type described with respect to FIGS. 1 and 2.

High-Cost Objects

The following describes the optimization of webpage image files in a CDN. This is but one example to illustrate the nature and challenges of caching objects that must be retrieved from an origin server and processed in the CDN. Images for a web page are but one example.

Web Images

Web images are usually created to be rendered at the end user's client device. The typical user client device includes desktop computers and handheld devices such as smartphones and tablets. A set of standards for digital image coding and image formatting together with necessary image object retrieval communication protocols as part of HTTP have been well established. As long as web image files are formatted in some standardized way, the end user's client device should be able to access them on the web and open them locally on the end user's client device for viewing. This decoupling between publishers and consumer devices is an important factor to a wide adoption of web images by most web sites.

Figure 3:
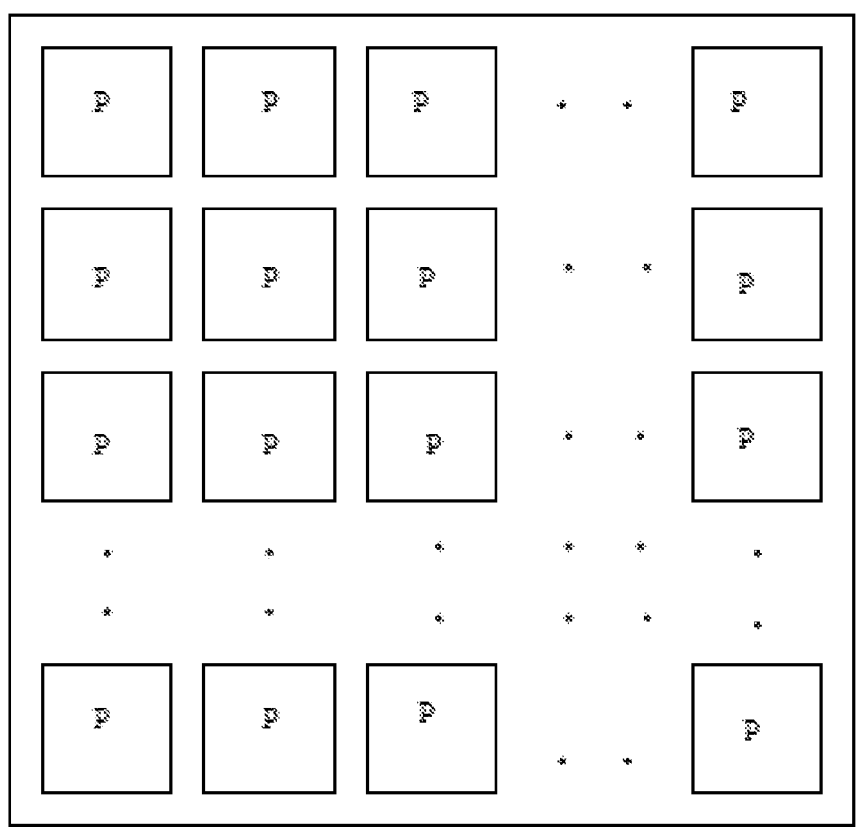
FIG. 3 is a conceptual diagram of an image file.

Although there are many ways to format an image file, generally image files are an array or a grid of pixels with some metadata. The pixel is the smallest unit of image file construction and rendering. Low resolution images have a low number of bits to represent one pixel whereas high resolution images have a high number of bits for each pixel representation. In fact, non pixel-based image file construction methods, like vector graphics, need to be converted to a pixel-based format to be properly displayed on the end user's client device. In the industry, this kind of image format conversion is called rasterization. Raster graphics is the general term to indicate the pixel-based format of image files. The most popular consumer display device type, LCD (Liquid Crystal Display), is also fundamentally designed to show an image in a pixel by pixel method. This generally pixel-based approach not only dictates the way the image is constructed but also the way it is displayed on an electronic screen. Notably, each image element, a pixel, is rendered on an electronic display panel independently of others. One corrupted element would not block other elements from being properly displayed. FIG. 3 shows a conceptual diagram of an image. The label "P" represents each pixel, and an image is a collection of a large number of pixels. Each pixel is created in some sequence and rendered on the end user's device in some sequence, too.

Web Image Rendering

While the decoupling of web image construction and end user rendering has been a key to the success of images on the web, the decoupling necessarily brings another new challenge, the mismatch of overall capability between production and rendering equipment. For example, the size of the original image may or may not well fit the size of the end user display panel in the framework of the web page. Also, the resolution of the original image can be higher than that of the end user client device.

It is therefore desirable—and common in the industry—to create many different versions of the original image to allow them to best fit each of the range of end user client device capacities. One way to recognize the capability of the end user client device is to utilize the HTTP request message header "User Agent", where the requester usually puts the information about the entity, which is sending the HTTP request; one can also rely on the intelligence of a CDN provider about the end user client device and network connection type. In many cases, the User Agent reveals the browser name and version, which can be used for the end user client device characterization purposes.

Given knowledge about the client device, generally speaking, image service logic can execute as follows (assuming no CDN in the delivery path):

1) The end user client device sends an HTTP request message to a web server;
2) The web server investigates the user-agent in the request message;
3) CDN provider pinpoints the overall capability and network type of the end user device for the web server;
4) The web server selects a version of the image object, which best fits the capability of the end user client device;
5) If a suitable version is not found, the web server can create one in the course of reply dynamically;
6) The web server sends an HTTP reply message back to the end user with the selected or newly created version.

Image Optimization by a CDN

Creating and maintaining a comprehensive set of versions for each and every website image for the variety of end user devices is a practical challenge for many website owners. One solution is to use a third party entity, which is specialized to handle image creation, maintenance and delivery to all end users on a global scale. The Image Manager product provided by Akamai Technologies, Inc., is one such solution.

Typically a third party entity (e.g. a CDN) deploys image servers on a global scale, and utilizes the image servers for the full cycle of web image creation, maintenance, and delivery to end users regardless of the end user location. With such a third party in place, the image service logic changes as follows:

1) The web site owner changes the URL for the image to the third party entity
2) The end user client device sends an HTTP request message for the image to the third party server;
3) The third party server determines the capability of the end user client device with the user-agent information in the request message and the type of network, to which the end user is connected;
4) The third party server selects or dynamically creates a version of the image object that best fits the overall capability of the end user client device; the third party server sends an HTTP reply message back to the end user with the selected or the version that was dynamically created.

Offline Image Processing for Improved Performance

Creating a best-fit version for the end user's client device capability dynamically, i.e., in the course of generating an HTTP response, negatively impacts the overall web page download performance. This is because the image conversion takes some non-negligible amount of time. One image format conversion can easily take a few hundreds of milliseconds. One solution to this problem is to create, in real-time, all possible derivative versions of original images to the variety of end user device, and, cache them all on the CDN. But this approach is problematic: creating a bundle of derivatives of an original image usually takes longer than one single image conversion, and may even extend into the range of a couple seconds, or even into the tens of seconds depending on the perceptual quality of the images desired by the customer. This means that creation of an image bundle as part of a real-time HTTP request/response chain is likely to take up a sizable portion of the entire page download time. A bundle typically takes a few tens of image versions reflecting the variety of end user client devices. The bundle size will only increase as the range of end user client devices continues to expand and diversify. To satisfy the needs of high delivery performance, including low page download time, and the needs of bundle creation of a given original image, an image server network of the sort shown in FIG. 4 can be used in the CDN.

Figure 4:
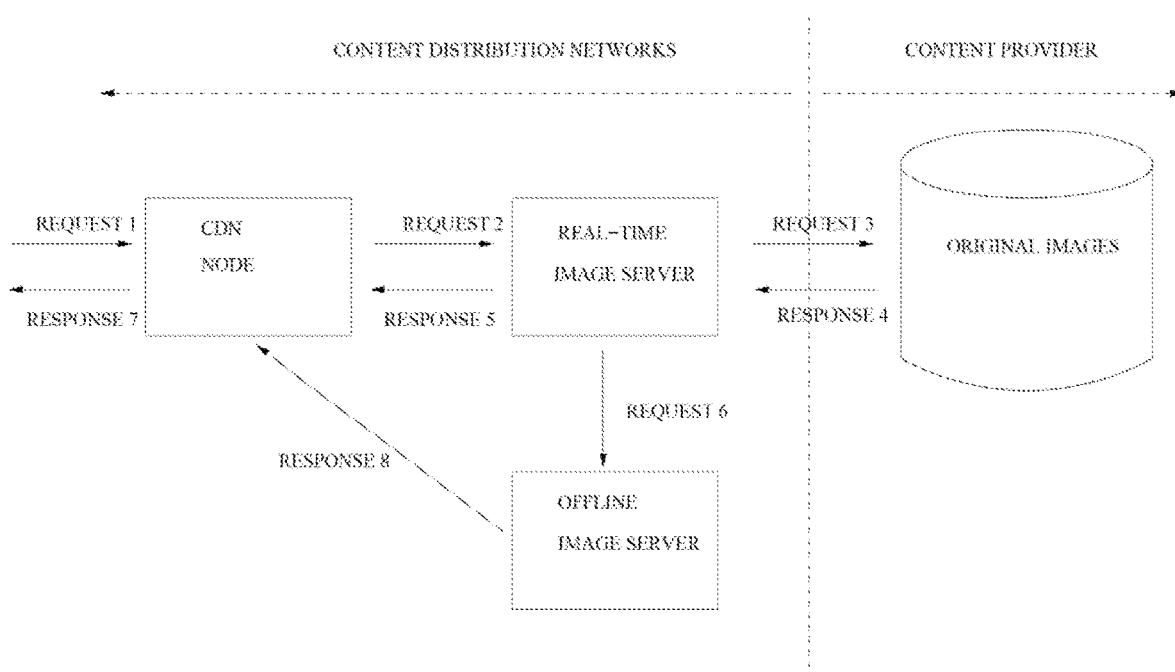
FIG. 4 is a schematic diagram of an image server network in a CDN.

In FIG. 4, a real-time image server in the CDN receives an image request, for which the CDN does not have a copy, fetches the original image from the content provider, creates an interim version of image (or perhaps the unmodified original image), includes this interim version image in the HTTP response message, and finally creates a job for the offline server to create a bundle of derivative images of the original image. The offline image server in turn creates a bundle of derivative images of the given image, in which each derivative version is the optimized version to a specific end user device. Upon completion, the offline image server uploads the derivative bundle to the CDN server, which requested the image first.

Though not optimized as fully as the derivative image bundle, the interim version of the image can be created relatively quickly, e.g., on the order of 100-200 milliseconds in some cases, satisfying the performance needs of the system.

With this image server network architecture in place, the web image service logic can proceed as follows (with reference to FIG. 4):

1) REQUEST 1: a CDN server (labeled CDN node) receives an image request from the end user side;
2) REQUEST 2: finding no valid copy in cache, the CDN server issues a forward image request to the real-time image server;
3) REQUEST 3: the real-time image server issues a forward image request to the content provider origin for the original image;
4) RESPONSE 4: the origin responds to the real-time image server with the original image;
5) RESPONSE 5: the real-time image server creates an interim version which better fits the end user's client device, and responds to the CDN server with the newly created interim version;
6) REQUEST 6: the real-time image server sends the original image to the offline image server 406;
7) RESPONSE 7: the CDN server responds toward the end user with the newly created interim version;
8) RESPONSE 8: the offline image server creates a complete derivative bundle of the original image, and, uploads the bundle to the CDN server that initiated the whole chain of image requests and responses;
9) From this time forward—unless and until the original images changes—the CDN server has a full set of optimized images to the variety of end user client devices, and hence for those the CDN server can respond to future requests directly without further consulting the real-time image server REQUEST 6 and RESPONSE 7 are likely to happen in parallel in the time domain.

Figure 5:
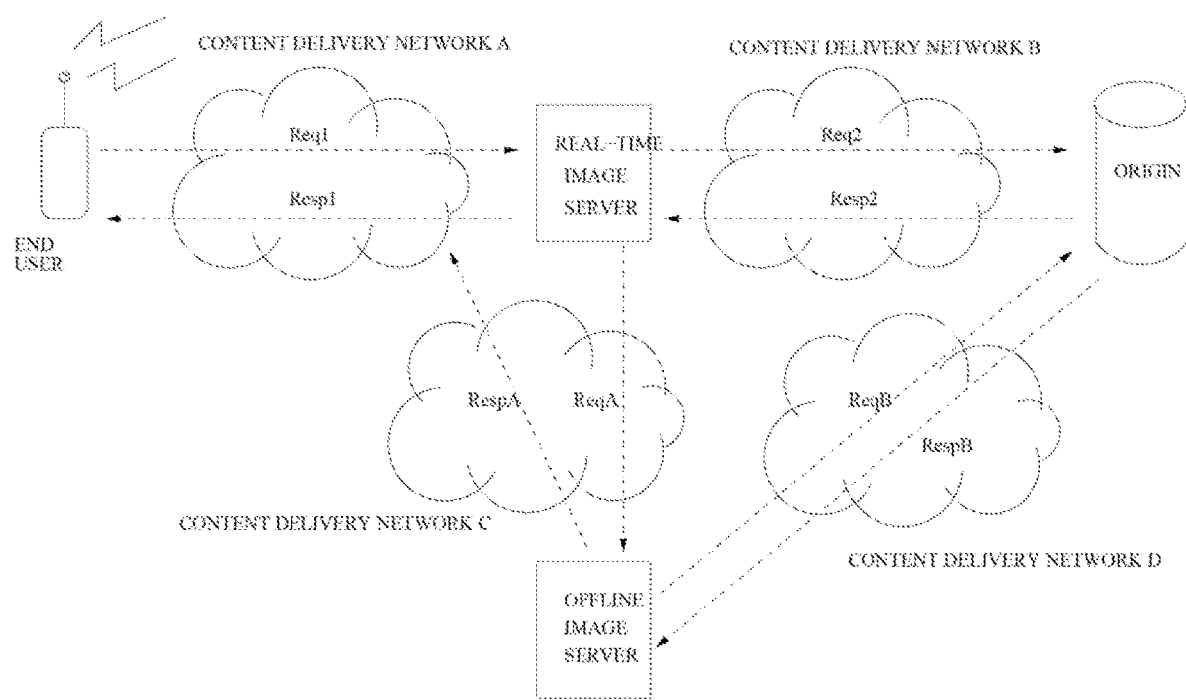
FIG. 5 provides a typical network implementation of the image server network shown in FIG. 4.

FIG. 5 provides a typical implementation of the image server network shown in FIG. 4. It is noted that the labels for "content delivery network A" through "content delivery network D" are meant to indicate different CDN assets/infrastructure of a single CDN service provider, not necessarily different ones.

The CDN may have other nodes between the real-time image server and the origin, between the real-time and offline image servers, and, between the offline image server and origin. The communications described above in connection with FIG. 4 can be directed through these additional nodes (e.g., relayed through). The nodes can provide a degree of caching, as well. While presence of such nodes between each pair of network elements can appear to be overhead-inducing, in fact it can provide freedom in where to deploy each network element. The CDN optimizes data transfer between each pair of network elements on the globe. See for example, U.S. Pat. No. 6,820,133, U.S. Patent Publication No. 2016/0150055, and U.S. Pat. No. 7,660,296). In the network architecture shown in FIGS. 4-5, the real-time image server sends a request to the offline image server with an original image. This requires a rather large storage at the offline image server side because the offline image server takes relatively long time to produce a bundle of derivative images of a given original image. To avoid the large storage problem, one option is to register the bundle request with the offline image server so that the offline image server can later fetch the original image from the content provider for the bundle creation when it can schedule the job of bundle creation. Note that FIGS. 4-5 represent one possible implementation. In other implementations, the two logical entities of real-time and offline image servers can be implemented on one single server depending on the capability of each individual server, as those skilled in the art will understand. For example, in some deployment, the intermediate nodes represented by content delivery networks B, D in FIG. 4 may not be present due to the proximity between the image servers and origin.

Caches for Global Performance

Now described is the role of caching in the image delivery architecture, and in particular the operation of going forward to the origin server to retrieve the original image. As described earlier, when a server (image server or otherwise) experiences a cache miss and needs to go back to origin, it is known to employ cache groups, and in particular cache hierarchies, of the kind described in (for example), U.S. Pat. No. 7,376,716, and Chankhunthod et al., "A Hierarchical Internet Object Cache", Proceedings of the USENIX 1996 Annual Technical Conference, San Diego, Calif. 1996. The parent cache can be chosen in a dynamic manner, based on network distances and conditions, such as described in U.S. Pat. No. 7,274,658.

In practice, cache groups are logically segmented from one another in order to optimize both the cache footprint, hit ratio and download performance. For a particular origin, therefore, depending on the geographic coverage of the content there can be multiple distinct cache groups. Assume for illustrative purposes that the origin were located in a central place in the United States. End users from the West Coast and from the East Coast can be served by two independent cache groups, one optimized for each end user population. In this scenario, there is at least one copy of a frequently accessed web object in each of the two cache groups. While the cache footprint will grow by a factor of two, the download latency is bounded to the latency from the central location to each coastal end user population.

Another example: consider a global social media website, with cache groups segmented and optimized for each country, continent or economic block. In this example, there can be many copies of the same web object across the cache groups at any given moment.

Some globally-focused content providers establish origin servers in multiple geographical areas, so as to serve each end user group at best performance in page download time. In this case, the content provider typically must maintain content consistency among origin servers in different groups. As a result, distinct and independent cache groups will naturally be created to serve each of the large end user groups. Architecturally, the resultant global image cache groups may look like FIG. 6.

Figure 6:
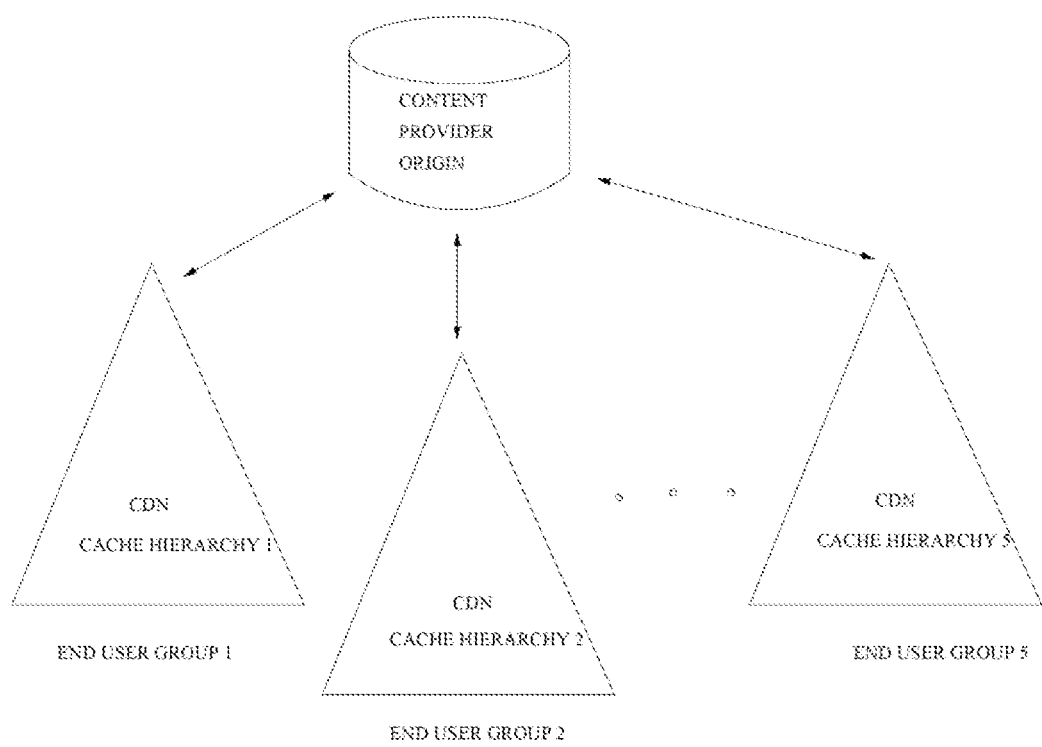
FIG. 6 is a schematic diagram of cache groups, in one embodiment.

In FIG. 6, each cache group is constructed with some logical hierarchy from the end user group toward the origin. This means that there are many cache servers located closely to the end user group, and, fewer cache servers toward the origin, in a classic cache hierarchy arrangement. This kind of hierarchical cache is known in the art and commonly appears in both Internet cache networks and between CPU and memory in computer architectures, where higher level entities are tasked with serving the cache misses from the lower level entities.

Each cache hierarchy in FIG. 6 is a logically independent cache group constructed with some hierarchy.

Cache Independence Problem

The independence of each logically separate cache group is by design for performance. Even though a server in a given cache hierarchy may experience a cache miss, and the object that it needs may be in another cache hierarchy, finding that cached object in the other cache hierarchy requires a very large-scale and infrastructure to support that search in a prompt manner. Such an infrastructure could be based on a DNS-style service inside of the entire CDN infrastructure, which could pinpoint where a desired copy of web object currently resides. Technically however this kind of cache sharing on a global scale would be prohibitively costly due firstly to the very large number of web objects that can be present in the global content delivery networks at any given moment, secondly to the high percentage of churning of the cached web objects, and, lastly the extended network latency when a found cached object is far away. Practically therefore it is has conventionally thought to be economically and performance-wise much more feasible to issue a forward request to a cache parent and if further misses occur up to the top of the cache hierarchy, ultimately up to the content provider origin. For these reasons, in the industry it is typical to strategically deploy cache servers at the top of a hierarchy close to the content provider origin, so as to minimize the forwarding-induced network latency. Cache hierarchies for images are no different.

Cost of Image Processing

Cache lookups for images (e.g., in a system such as described in FIGS. 4-5) incur significant workload throughout the chain of HTTP request and response. Each request forwarded to the origin is responded with an original image. The original image is firstly processed by the real-time image server once for an immediate response with a semi-optimized version, and, secondly processed by the offline image server for the creation of a comprehensive set of optimized versions to the variety of end user client devices.

The cost of image processing is largely proportional to the variety of end user client devices. If there are 32 different kinds of end user devices, for example, the original image may be reproduced for each of the 32 categories of different end user client device capability. If there are C logically separate and independent cache hierarchies established for the content provider, the maximum overhead O of processing of image i will be:

$$\bigcap_{i^{max}} = C \times O_i \qquad \text{(Equation 1)}$$

Where $O_i$ is the overall cost of real-time and offline processing of the image i.

Processing Images at Scale

When a content provider has a large number of images on a website, the simple linear multiplication by C in Equation 1 above becomes substantial in magnitude. For example, in case of C=5 and a content provider with i=200 million images, the formula states that image processing will be performed 1 billion times just for the initial establishment of the web images within the CDN for this single content provider. This is without considering cache eviction-induced additional reprocessing.

Social media and user generated content websites must handle many image uploaded by users. If the image networks are serving a group of content providers, which have a total website images in the scale of 10-100 billions, and 10% of the web images are churning everyday, meaning that about 10% of them are newly uploaded everyday, the daily workload imposed to the image cache hierarchies just by the new uploads will be 5*(1 to 10) billion times of the image processing.

In theory, decrementing the value of C by a small amount would save a large scale deployment of image cache networks and servers, because in Equation 1 the value of C is magnified i times, and i is typically very large.

Impact on Content Provider Origin

A content provider incurs costs in data center operation. One important portion of the data center operation cost comes from the network usage in terms of bandwidth cost. For a content provider with a large number of website images, the efficiency of the cache hierarchy and of the value C affects operational cost. The best case for the content provider is obviously the case, where C is 1.

Cache and Origin Collaboration

Solutions to the cache-management problems set forth above are now described.

One method to achieve better caching, and more efficient image delivery, is to enhance cache and origin server collaboration. As seen in FIG. 6, an image can be fetched multiple times from the origin server, based on forward requests from multiple cache hierarchies. Furthermore, the delivery of images poses a particular and added overhead to the CDN in the course of processing, as shown in FIGS. 4-5. This additional image optimization overhead is sizable both in response time and the overall cost of image server cluster construction, operation and management. It should be understood that other kinds of compute-heavy object processing (e.g., edge assembly of web objects into a page, video transcode, etc.) are similarly burdensome and can be benefit from the teachings hereof; the example of an image on a website is merely used for explanatory purposes.

Figure 7:
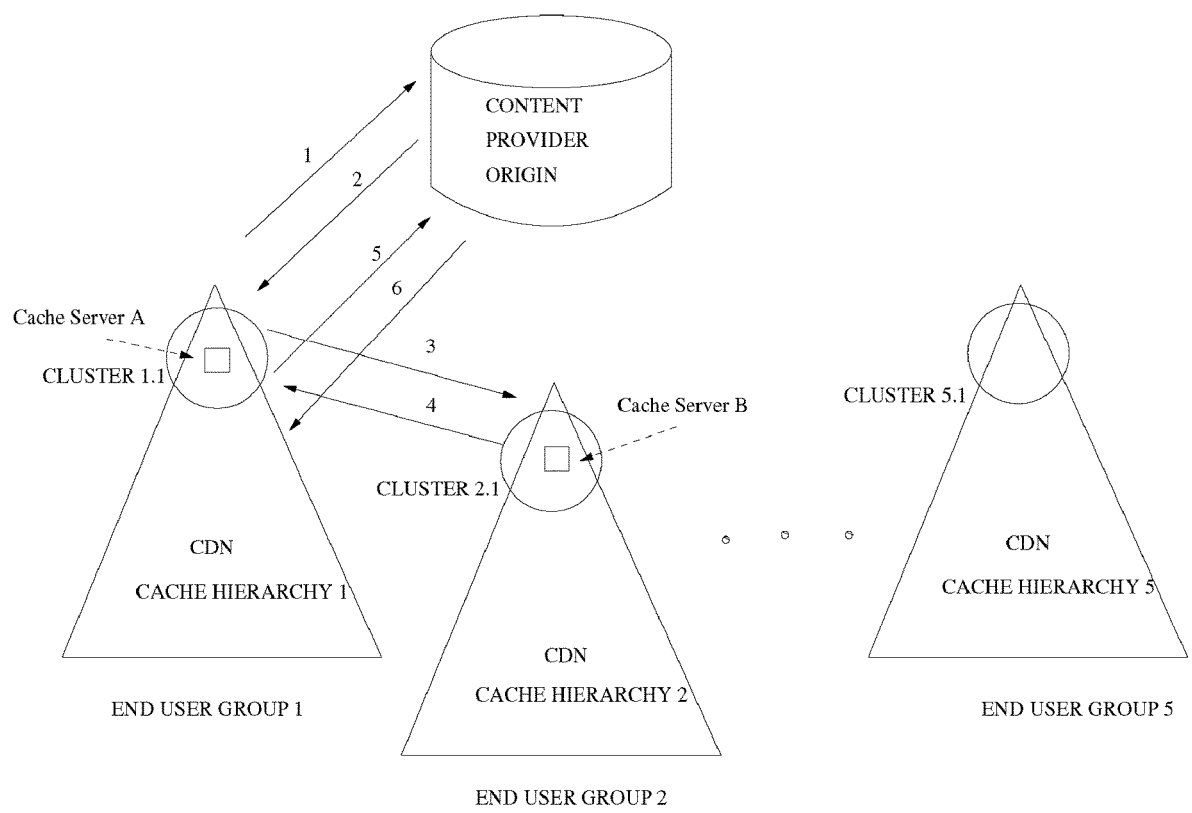
FIG. 7 is a high level workflow for image optimization and image delivery in a CDN, in one embodiment.

The cache and origin collaboration proposed in this document provides a way in an effort to minimize the additional overhead of image optimization in the course of HTTP response. An embodiment of a high level workflow is shown in FIG. 7; a description of the workflow follows.

1) Arrow 1: an HTTP request for a web image is made from Cache Server A at the top of the CDN cache hierarchy 1 to the origin server;
2) Arrow 1: upon receiving the request, the origin server finds the original image requested from its back end image store;
3) If the requested image is tagged with some piece of information about the last request served (referred to as a cache hint), the origin server constructs a response message using the cache hint without an original image file;
4) If the requested image is not tagged, the origin server constructs a response message using an original image file;
5) Arrow 2: a response message is sent back to the Cache Server A;
6) Arrow 2: Cache Server A receives the response message;
7) If the response message contains an image file, the regular workflow of FIGS. 4-5 is followed;
8) If the response message contains only the cache hint, Cache Server A extracts more details from the cache hint, interprets the details, and makes a decision about where to fetch either an original copy or an optimized version of the image based on those details;
9) Arrow 3: Cache Server A sends an HTTP request to another cache server, Cache Server B, which is identified using the information the cache hint that was received from the origin server;
10) Arrow 4: Cache Server B replies back to Cache Server A with either an original or the requested optimized version image;
11) Arrow 4: if Cache Server A receives an optimized version, it serves the optimized image to the client bypassing the process and overhead of image optimization in the course of response;
12) Arrow 4: if Cache Server A receives an original version, it follows the regular workflow of FIGS. 4-5;
13) Arrow 4: if neither an original nor the requested optimized version is not found, Cache Server B replies to Cache Server A with the HTTP status code 404 'Not Found';
14) Arrow 5: upon receiving an HTTP 404 from Cache Server B, Cache Server A creates a new cache hint, constructs another HTTP request for the original image with the cache hint, sends it to the origin server;
15) Arrow 5: the origin receives the HTTP request for an image and the cache hint;
16) Arrow 6: the origin responds to Cache Server A with a copy of the original image, and, tags the original image file with the new cache hint.

Cache Hint

Preferably, the cache hint is a piece of information based on which Cache Server A can identify and contact Cache Server B. Because the cache hint preferably functions to point Cache Server A to a server which may have the image cached, the cache hint is referred to as a 'pointer'.

Pointers may be direct or indirect. An example of a direct pointer is an IP address. An indirect form of a pointer can be a hostname, e.g. a CNAME (canonical name in RFC 1034). The teachings hereof are not limited to any particular format. Different CDN providers can use different form of information. Moreover, the cache hint may point to a cache server, cache child, a cache group, to a real-time or offline image processing server, or any CDN asset.

Preferably, a cache server going to the origin server constructs the cache hint by inserting a pointer to itself, as it will expect to get the original image from the origin server. Alternatively, it can construct the cache hint with an address or hostname or other information that points to another server in the CDN, such as the real-time or offline image processing server, that the cache server will use, knowing that the original and optimized and/or derived images will be there shortly. If the cache server constructing the cache hint is a cache parent fetching on behalf of a child, it may insert a pointer to the cache child that is requesting the original image.

The cache hint can be encrypted for security purposes so that the information about which cache server has which image copies remain hidden from outside observers. The content provider origin can associate this cache hint with the image requested. The association can be made by storing it with the image, or by utilizing a separate database that stores cache hints for origin server objects.

Currently, HTTP standards do not provide for a cache hint of the nature described in this document. The teachings hereof can be implemented using standard HTTP features, however. One example of an implementation is to use a non-standard form of header in both HTTP request and response. This is referred to as an X-header. More specifically, an example is to use a key value pair as follows:

X-Cache-Hint: [encrypted value]

The value of "X-Cache-Hint" can be the IP address of a cache server to save the name resolution time. Further, in addition to the IP address, the value of "X-Cache-Hint" in reality is likely to contain other information to facilitate the finding of the previous cache server (e.g., Cache Server B in FIG. 7). This means that the cache hint is not limited to one item of information. As FIG. 7 suggests, the additional information will be the information, with which Cache Server A can identify and contact Cache Server B. Here is a concrete example of a set of information in a cache hint pointing to Cache Server B:

1) The IP address of Cache Server B;
2) The cluster ID Cache Server B belongs to (which is Cluster 2.1 in FIG. 7);
3) The cache hierarchy ID that Cluster 2.1 belongs to at the top of the hierarchy (which is Cache Hierarchy 2 in FIG. 7);
4) The datacenter ID the top cluster belongs to (this is not shown in FIG. 7)

A cache hierarchy often extends from one geographic location to another on the globe. As such, it is likely that clusters towards to the content provider origin and clusters towards to the end user are geographically far away from each other. This means that one cache hierarchy is dynamically formed from a set of datacenters. This is why it the datacenter information can be useful to include in the cache hint.

Cache Availability at Another Cache

Caching or cache eviction algorithms are generally dynamic. Frequently referenced objects typically have higher chances of being available at a cache server and vice versa. One well-known example of a cache eviction algorithm is LRU (least recently used), in which less frequently requested objects are evicted first when cache space is constrained. So, when Cache Server A goes to Cache Server B in FIG. 7, there is not an absolute guarantee of cached object availability at Cache Server B.

Arrows 5 and 6 are followed in case the requested object is not found at Cache Server B. In this case, Arrows 1, 2, 3 and 4 all end up in a branch that causes an overhead, which is a cost of cache and origin collaboration. Hence, the efficiency of this proposal is upper bounded by the false positives, where the requested object is not found at the other cache server, suggested in the cache hint.

In light of the above, Cache Server A needs to make a decision upon receiving the cache hint from the origin about which action to take next. If Cache Server A determines that there is high chance of availability at Cache Server B, it generates Arrow 3. Otherwise it generates Arrow 5, bypassing Arrow 3. The decision is preferably based upon the caching algorithm specifics of the CDN provider.

One practical way to minimize the false positive case is to use the HTTP message header for the TTL (time to live) to specify the lifetime of the cache hint. The origin server will expire (or will not send) the cache hint when the cache hint passes the TTL. In case of expiry, Arrow 2 will contain a copy of the original image without cache hint.

Using this approach, two new headers can appear in the HTTP request as follows.

X-Cache-Hint: encrypted value
X-Cache-Hint-TTL: 86,400 (in seconds)

Effects of the Cache and Origin Collaboration

Figure 8:
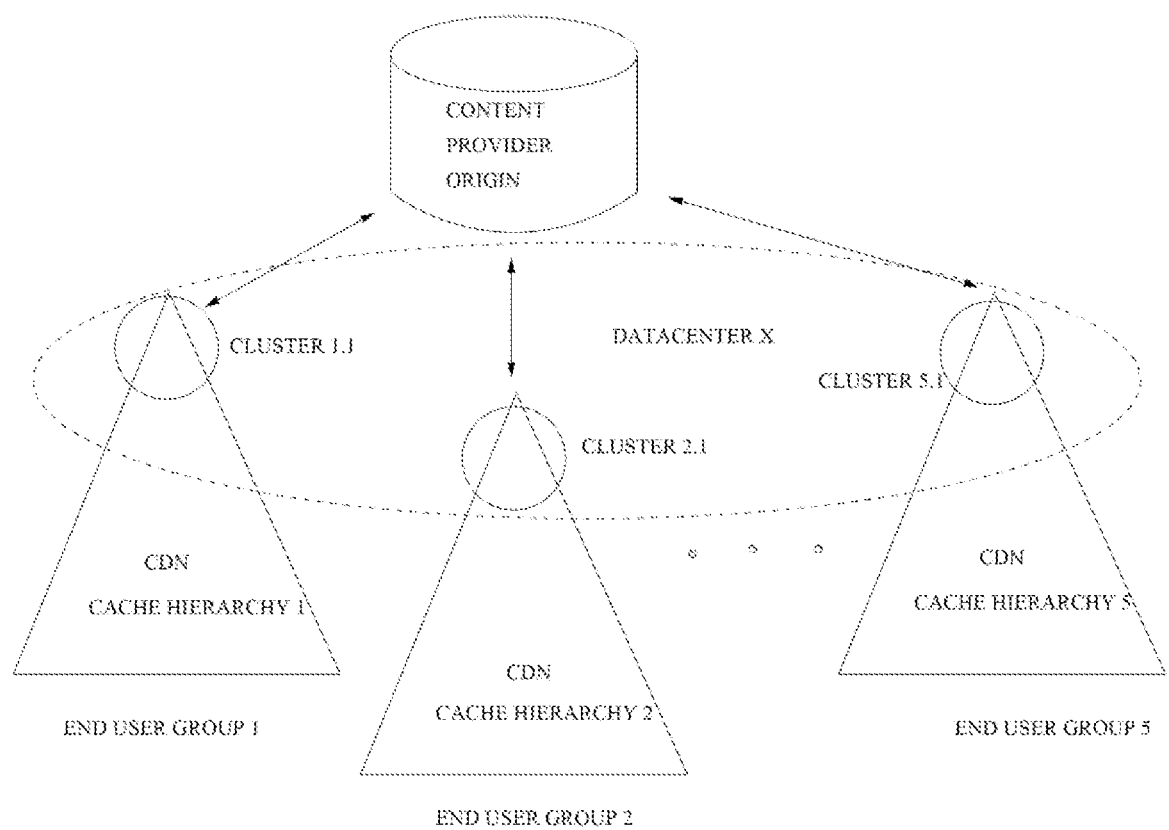
FIG. 8 is a schematic diagram illustrating a data center with cluster machines belonging to multiple cache groups.

The effectiveness of cache and origin collaboration is maximized when the top portion of the cache hierarchies are coexisting in the same datacenter, such as "Datacenter X" as in FIG. 8. This is because the bandwidth cost for Arrows 3 and 4 in FIG. 7 is low.

Given that the top portion of each cache hierarchy itself can be a cluster the cached object sharing between the cache hierarchies will be highly effective by the help of a cache hint stored and served by the origin server. The cache hint is likely to be pointing a cache server in the cluster or at least in the datacenter, which recently retrieved the original image from the origin. As a matter of fact, in many large cities, this scenario of deployment is commonly found. Without the collaboration with origin server, to achieve the same level cached object sharing by cache hint, another complicated functional entity would be needed which is able to tell which datacenter and server therein has which objects at any given moment.

When a requesting cache server itself is capable of image optimization, in this scenario, the overhead of dynamic image optimization can be easily avoided since, in FIG. 7, Cache Server B can not only convert an original image to a set of derivatives but also store the optimized versions locally in its cache. Such cache servers may utilize GPUs for image processing; see also U.S. Pat. No. 7,653,706, the disclosure of which is incorporated herein by reference.

Given a cache hint, the cost of contacting another cache server is now discussed. One might posit that the cost of contacting another cache server could be higher than the combined cost of contacting the origin server and performing dynamic image optimization and/or rendering a bundle of derived versions. An example of a logical flow at a cache server is given using FIG. 9 as follows:

1) Cache Server C sends a request to the origin (Arrow 11);
2) Soon, Cache Server C receives a response with cache hint (Arrow 12);
3) Cache Server C extracts the contact information of another cache, Cache Server B, which is likely to have either an original or an optimized version of the request image;
4) Cache Server C compares the expected network cost of contacting Cache Server B and the expected overall cost of dynamic image optimization;
5) If the cost of contacting Cache Server B is not considerably smaller than the combined cost of contacting the origin and dynamic image optimization, Cache Server C does not request the object from Cache Server B (Arrow 13); instead, Cache Server C generates another HTTP request;
6) Cache Server C receives a response with a copy of the original image from the origin (Arrow 15);
7) The origin server tags the original image file with the cache hint from Cache Server C.

The teachings hereof are agnostic to the specific method of cost determination for contacting another cache server and dynamic image optimization. Different CDN providers have different cost models depending on the CDN server deployment and caching algorithms.

Figure 9:
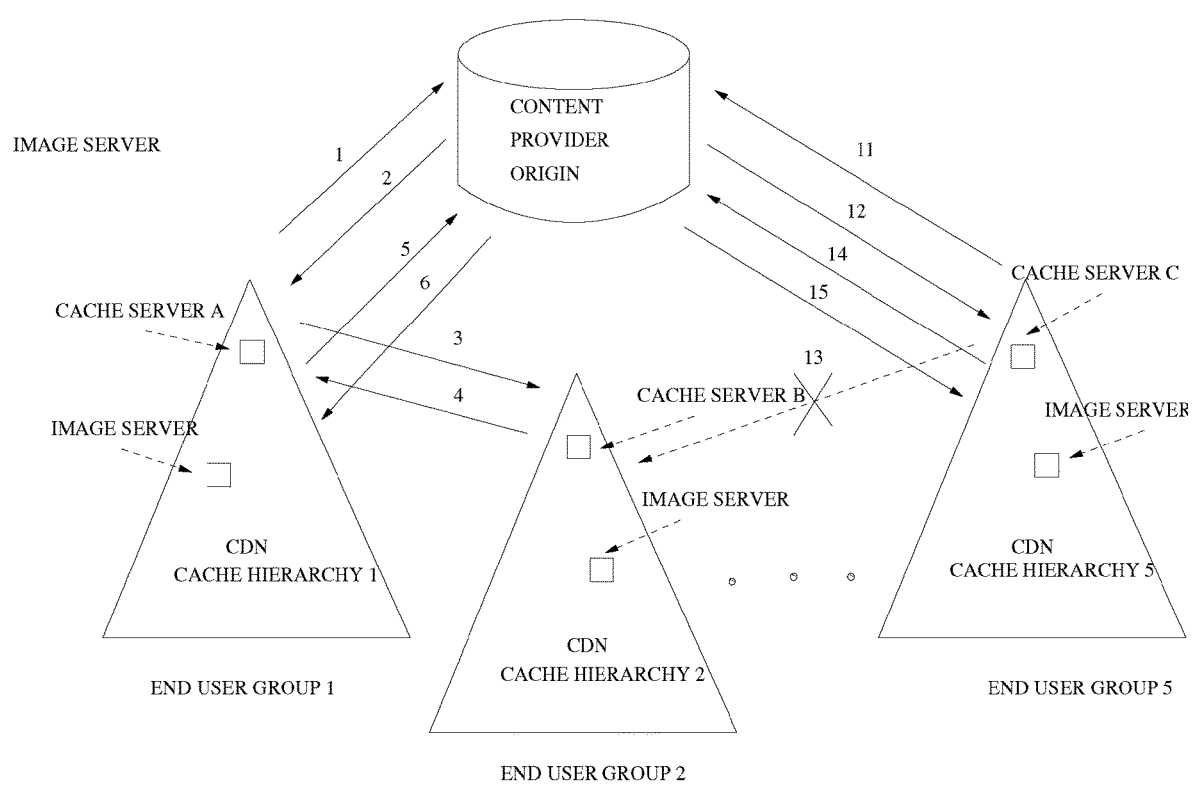
FIG. 9 is a schematic diagram illustrating the cost of object sharing across cache groups; and, FIG. 10 is a block diagram illustrating hardware in a computer system that may be used to implement the teachings hereof.

The cache hint preferably carries sufficient information to help make a decisive cost comparison. The example given above for the content of cache hint (IP address, cluster ID, cache hierarchy ID, datacenter ID) is one effective practical example. FIG. 9 shows the case of least effectiveness of this proposal, in a scenario in which the image server and cache server are physically separated. In this case, the maximum benefit of this proposal will be the bandwidth reduction at origin by the virtue of original image sharing between cache hierarchies.

Of course, the content provider can save on bandwidth usage at the origin infrastructure by associating the original image file with cache hint. Given that the bandwidth cost is generally proportional to the total number of bits, even with for example a 50% probability of the cache hint effectiveness for each image request, the content provider can potentially reduce the bandwidth cost in half. The bandwidth usage for cache hint is a relatively small fraction of that for images. Website image sizes are usually a few hundreds of thousands of bytes.

The CDN can also reduce the cost for image optimization and delivery. If all image content providers participate in this proposal, and, the dynamic image optimization events are reduced in half, the entire infrastructure for the image optimization and delivery would potentially be reduced in half, too.

Group Key for Cache Hint

To extract the contact information of another cache server from the cache hint, a mechanism for group key management is needed so that any member server can encrypt the information for cache hint, and, any other member server can decrypt the cache hint.

Group key management is a well establishment research topic and industrial practice. One recent work on group key agreement can be found in Y. Kim, et al., "Tree-based Group Key Agreement," ACM Transactions on Information and System Security, pp. 60-96, Feb. 2004, as an example.

Cache and origin collaboration proposed in this paper does not create any new challenge to the well established practice. The group size in this proposal is estimated to grow to the scale of a few hundreds of cache servers, which is a relatively small size to create a new challenge in group key management.

As it is usual to observe a daily pattern in the retrieving traffic volume of content providers, a daily rotation of the group key is practical.

In sum, potential advantages provided by the teachings hereof include bandwidth cost reduction by the content provider and by the CDN, dynamic image optimization cost reduction, image download performance improvement. The foregoing are characteristics and potential benefits that may be achieved in certain embodiments of the invention; they should not be viewed as necessary to the practice of the invention.

Quantifying Bandwidth Savings

The potential cost savings can be quantified and provided to wary content providers to show the value of the teachings hereof. The cost savings developed here are general in nature and by way of illustration to show potential advantages of the invention; they are not intended to be rigorous analyses of cost and achieving these or any particular cost savings are not required to practice the teachings hereof.

The total bandwidth cost at the content provider side with the cache hint in place is given by $$B_{tot}^1 = (H \times S_{image} + S_{hint}) \times R \quad \text{(Equation 2)}$$

Where $B_{tot}^1$ is the total number of bits with the cache hint, H is success ratio of cache hint (Cache Server A found Cache Server B with the desired content), $S_{image}$ is the average size of original images, $S_{hint}$ is the cache hint size, and R is the total number of requests served.

Total bandwidth cost without the cache hint is simply given by:

$$B_{tot}^2 = S_{image} \times R \quad \text{(Equation 3)}$$

In one embodiment, a size of cache hint may be about 64 bytes (32 bytes for IPv6 and another 32 bytes for CDN specifics); this is generally multiple orders of magnitude smaller in comparison to the size of average original web images about 500,000 bytes.

So the bandwidth cost reduction ratio at the content provider side can be expressed as:

$$(B_{tot}^2 - B_{tot}^1)/B_{tot}^2 \quad \text{(Equation 4)}$$

This is given by H with an error margin of about 0.01%. For large content providers, even 10% success ratio would result in a substantial bandwidth cost saving due to the very large volume of traffic.

The total bandwidth cost reduction at the CDN side is given by $$B_{tot}^3 = (\alpha \times H \times S_{image} + (1-H) \times S_{image} + S_{hint}) \times R \quad \text{(Equation 5)}$$

Where, $\alpha$ is the per-bit cost ratio between fetching from another cluster (Cache Server B in FIG. 7) and fetching from the origin server. The value of $\alpha$ will be low for cases exemplified in FIG. 8. For example, with H 0.5 and $\alpha$ 0.5, the bandwidth cost reduction at the CDN side will be about 25%. Note that in this example, the bandwidth cost reduction at the content provider side will be 50%. Adding the two reductions together, the entire system will be much more bandwidth efficient, which will eventually benefit the end user. In the most favorable case, where the CDN can bypass the dynamic image optimization process with H probability in the course of HTTP response, the total CDN infrastructure cost for web image optimization and delivery could be down by potentially 100×H %.

Computer Based Implementation

The teachings hereof may be implemented with conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 10:
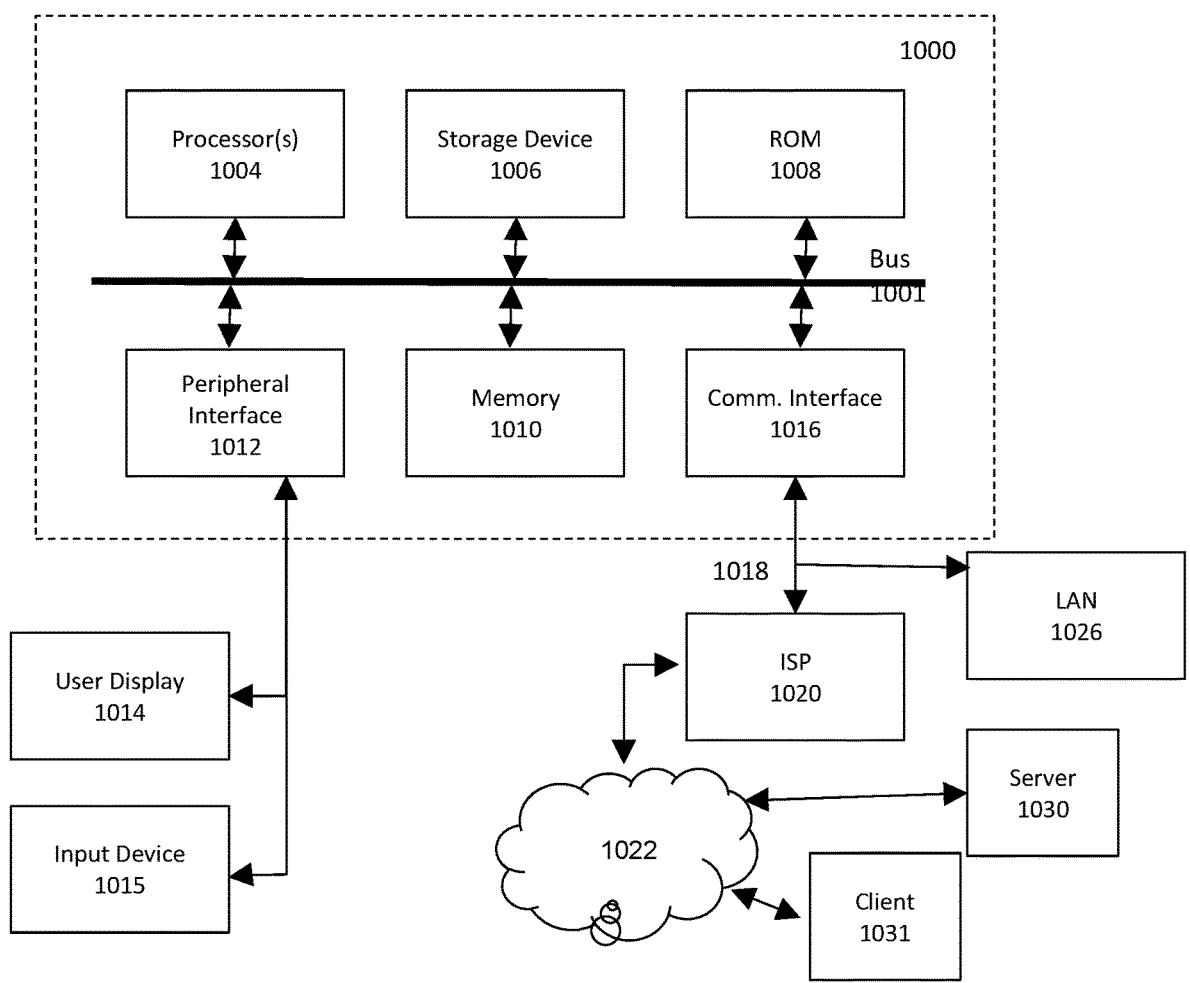

FIG. 10 is a block diagram that illustrates hardware in a computer system 1000 upon which such software may run in order to implement embodiments of the invention. The computer system 1000 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 1000 includes a microprocessor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1016 that provides a link (e.g., at a physical layer, data link layer) between the system bus 1001 and an external communication link. The communication interface 1016 provides a network link 1018. The communication interface 1016 may represent a Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code may be read from or stored on a non-transitory computer-readable medium, such as memory 1010, ROM 1008, or storage device 1006. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1018 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method executed by a cache server in a content delivery network, the method comprising:

receiving a first request for an original object, the first request being from a client;

determining (i) that the first request should be satisfied by serving the client a version of the original object distinct from the original object;

determining (ii) that the cache server cannot serve the version of the original object distinct from the original object from its local cache to the client, and responsive to said determinations (i) and (ii), sending a second request for the original object to an origin server; and, receiving a response to the second request, the response comprising a pointer enabling the cache server to determine a location of at least one of: the original object and the version of the original object distinct from the original object, within the content delivery network, the location being distinct from the client and the cache server and the origin server.

2. The method of claim 1, further comprising: responsive to receiving the pointer, executing a cost calculation to determine whether to request the at least one of: the original object and the version of the original object distinct from the original object, from the location in the content delivery network determined from the pointer.

3. The method of claim 2, wherein the cost calculation includes consideration of bandwidth cost in contacting the location identified by the pointer.

4. The method of claim 1, wherein the cache server sends the second request to an origin server associated with the original object.

5. The method of claim 4, wherein the cache server receives the response to the second request from the origin server.

6. The method of claim 1, wherein the original object comprises an image and the version of the original object distinct from the original object comprises a modified image.

7. The method of claim 1, wherein the original object comprises a multimedia presentation and the version of the original object distinct from the original object comprises a transcoded multimedia presentation.

8. The method of claim 1, wherein the client comprises any of: an end user client and another cache server in the content delivery network.

9. The method of claim 1, wherein the pointer enables the cache server to locate the version of the original object distinct from the original object within the content delivery network.

10. A non-transitory computer-readable medium holding computer program instructions for execution on one or more processors in a cache server in a content delivery network, the computer program instructions including instructions for causing the cache server to:

receive a first request for an original object, the first request being from a client;

determine (i) that the first request should be satisfied by serving the client a version of the original object distinct from the original object; and, determine (ii) that the cache server cannot serve the version of the original object distinct from the original object from its local cache to the client, and responsive to said determinations (i) and (ii), send a second request for the original object to an origin server; and, receive a response to the second request, the response comprising a pointer enabling the cache server to determine a location of at least one of: the original object and the version of the original object distinct from the original object, within the content delivery network, the location being distinct from the client and the cache server and the origin server.

11. A method executed by a cache server in a content delivery network, the method comprising:
receiving a first request from a client;
determining that an object responsive to the first request cannot be served from a local cache of the cache server;
responsive to said determination, sending a second request to an origin server associated with the object; and, receiving a response to the second request, the response comprising a pointer enabling the cache server to determine a location of the object, previously generated, within the content delivery network, the location being distinct from the client and the cache server and the origin server;
wherein the object was previously generated as a result of computer processing by a set of one or more servers in the content delivery network.

12. The method of claim 11, wherein the object comprises an image.

13. The method of claim 11, wherein the object comprises a multimedia presentation.

* * * * *